United States Patent
Yu et al.

(10) Patent No.: US 10,271,223 B2
(45) Date of Patent: Apr. 23, 2019

(54) BEAM MANAGEMENT IN BEAMFORMING SYSTEMS

(71) Applicant: MEDIATEK INC., Hsinchu (TW)

(72) Inventors: Chia-Hao Yu, Yilan (TW);
Jiann-Ching Guey, Hsinchu (TW);
Ming-Po Chang, New Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/674,675

(22) Filed: Aug. 11, 2017

(65) Prior Publication Data

US 2018/0049042 A1 Feb. 15, 2018

Related U.S. Application Data

(60) Provisional application No. 62/501,936, filed on May 5, 2017, provisional application No. 62/374,056, filed on Aug. 12, 2016.

(51) Int. Cl.
*H04B 7/06* (2006.01)
*H04B 7/08* (2006.01)
(Continued)

(52) U.S. Cl.
CPC ............ *H04W 16/28* (2013.01); *H04B 7/043* (2013.01); *H04B 7/061* (2013.01); *H04B 7/0695* (2013.01);
(Continued)

(58) Field of Classification Search
CPC .. H04B 7/0617; H04B 7/0417; H04B 7/0639; H04B 7/0486; H04B 7/0626;
(Continued)

(56) References Cited

U.S. PATENT DOCUMENTS

2013/0017836 A1  1/2013 Chang et al.
2013/0065622 A1  3/2013 Hwang
(Continued)

FOREIGN PATENT DOCUMENTS

CN       103814529 A    5/2014
CN       103931109 A    7/2014
WO   WO 2013/165149 A1  11/2013

OTHER PUBLICATIONS

International Search Report and Written Opinion of the International Searching Authority dated Nov. 1, 2017 in PCT/CN2017/097177, 11 pages.
(Continued)

*Primary Examiner* — Ganiyu A Hanidu
(74) *Attorney, Agent, or Firm* — Oblon, McClelland, Maier & Neustadt, L.L.P.

(57) ABSTRACT

Aspects of the disclosure provide a method for beam management at a base station (BS) in a wireless communication system. The method can include transmitting a beam training reference signal (RS) resource configuration from a base station (BS) to a user equipment (UE) in a wireless communication system, transmitting an anchor association index indicating an association between a beam pair link and a set of second transmit beams of the BS, wherein the beam pair link is formed by a first transmit beam of the BS and a receive beam of the UE, transmitting beam training RSs according to the beam training RS resource configuration on the set of second transmit beams, and receiving a measurement report including quality measurements of beamformed channels over the receive beam and a subset of the second transmit beams.

22 Claims, 5 Drawing Sheets

(51) Int. Cl.
*H04B 7/0426* (2017.01)
*H04W 16/28* (2009.01)
*H04W 72/08* (2009.01)

(52) U.S. Cl.
CPC ........... *H04B 7/088* (2013.01); *H04B 7/0634* (2013.01); *H04W 72/085* (2013.01)

(58) Field of Classification Search
CPC ...... H04B 7/063; H04B 7/024; H04B 7/0469; H04B 7/10; H04B 7/0452; H04B 7/0632; H04B 7/0695; H04L 1/0026; H04L 25/03343; H04L 27/2601; H04W 36/0094; H04W 72/0406; H04W 72/042; H04W 72/085
See application file for complete search history.

(56) References Cited

U.S. PATENT DOCUMENTS

| | | | |
|---|---|---|---|
| 2013/0223251 | A1 | 8/2013 | Li et al. |
| 2013/0286960 | A1 | 10/2013 | Li et al. |
| 2014/0198696 | A1 | 7/2014 | Li et al. |
| 2015/0351119 | A1* | 12/2015 | Song ................ H04W 72/1268 370/329 |
| 2016/0192356 | A1 | 6/2016 | Lee et al. |
| 2016/0337916 | A1* | 11/2016 | Deenoo ................ H04W 8/22 |
| 2017/0033854 | A1* | 2/2017 | Yoo ....................... H04W 24/00 |
| 2017/0331670 | A1* | 11/2017 | Parkvall ............... H04J 11/0079 |

OTHER PUBLICATIONS

Taiwanese Office Action dated Jul. 17, 2018 in Taiwanese Patent Application No. 106127263, 10 pages.

\* cited by examiner

BEAM MANAGEMENT IN BEAMFORMING SYSTEMS

INCORPORATION BY REFERENCE

This present disclosure claims the benefit of U.S. Provisional Application No. 62/374,056, "Transparent Beam Management in Beamforming Systems" filed on Aug. 12, 2016, and U.S. Provisional Application No. 62/501,936, "Method for Beam Management for Wireless Communication System with Beamforming" filed on May 5, 2017, which are incorporated herein by reference in their entirety.

TECHNICAL FIELD

This present disclosure relates to beam management techniques in wireless communication systems capable of beamformed transmission. Particularly, the present disclosure relates to beam training processes for determining a beam pair link between a user equipment (UE) and a base station based on a hierarchical beamforming structure.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Beamforming schemes can be employed to focus transmitted and/or received signal in a desired direction to compensate for unfavorable path loss. Millimeter wave frequency bands facilitate usage of a large number of antenna elements in a compact form factor to synthesize highly directional beams.

SUMMARY

Aspects of the disclosure provide a method for beam management at a base station (BS) in a wireless communication system. The method can include transmitting a beam training reference signal (RS) resource configuration from a base station (BS) to a user equipment (UE) in a wireless communication system, transmitting an anchor association index indicating an association between a beam pair link and a set of second transmit beams of the BS, wherein the beam pair link is formed by a first transmit beam of the BS and a receive beam of the UE, transmitting beam training RSs according to the beam training RS resource configuration on the set of second transmit beams, and receiving a measurement report including quality measurements of beamformed channels over the receive beam and a subset of the second transmit beams.

In an embodiment, the first transmit beam is one of multiple first transmit beams, the receive beam is one of multiple receive beams, and a subset of pairs of one of the multiple transmit beams and one of the multiple receive beams are each assigned with an anchor association index. In an embodiment, the first transmit beam has coverage spatial resolution different from that of the second transmit beams. In an embodiment, spatial resolutions of each of the second transmit beams are finer than spatial resolution of the first transmit beam.

Embodiments of the method can further include transmitting a data transmission RS resource configuration from the BS to the UE, and transmitting data according to the data transmission RS resource configuration on a second transmit beam that is selected from the set of second transmit beams based on the measurement report. In an example, a same set of RS resources is used in the beam training RS resource configuration and the data transmission RS resource configuration.

An embodiment of the method further include establishing a radio resource control (RRC) connection via a beam pair link formed by a third transmit beam of the BS and a second receive beam of the UE. The beam training RS resource configuration and the data transmission RS resource configuration can be transmitted via the RRC connection. In one example, the anchor association index is transmitted via the RRC connection or a physical layer control channel. In a further example, the third transmit beam and the first transmit beam are a same beam, and the second receive beam and the receive beam are a same beam.

Aspects of the disclosure provide a second method for beam management at a user equipment (UE) in a wireless communication system. The method can include receiving a beam training reference signal (RS) resource configuration from a base station (BS) at a user equipment (UE) in a wireless communication system, receiving an anchor association index indicating an association between a beam pair link and a set of second transmit beams of the BS, wherein the beam pair link is formed by a first transmit beam of the BS and a receive beam of the UE, receiving beam training RSs configured according to the beam training RS resource configuration and transmitted on the set of second transmit beams with the receive beam indicated by the anchor association index, and transmitting a measurement report including quality measurements of beamformed channels over the receive beam and a subset of the second transmit beams.

Embodiments of the disclosure can further include receiving a data transmission RS resource configuration from the BS at the UE, and receiving data according to the data transmission RS resource configuration with the receive beam. The data can be transmitted on a second transmit beam that is selected from the set of second transmit beams based on the measurement report. In an embodiment, a same set of RS resources is used in the beam training RS resource configuration and the data transmission RS resource configuration.

In one embodiment, the method further includes establishing a radio resource control (RRC) connection via a beam pair link formed by a third transmit beam of the BS and a second receive beam of the UE. The beam training RS resource configuration and the data transmission RS resource configuration are transmitted via the RRC connection. In one example, the anchor association index is transmitted via the RRC connection or a physical layer control channel. In a further example, the third transmit beam and the first transmit beam are a same beam, and the second receive beam and the receive beam are a same beam.

Aspects of the disclosure provide a mobile device for beam management in a wireless communication system. The mobile device can include circuits implementing the second method.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
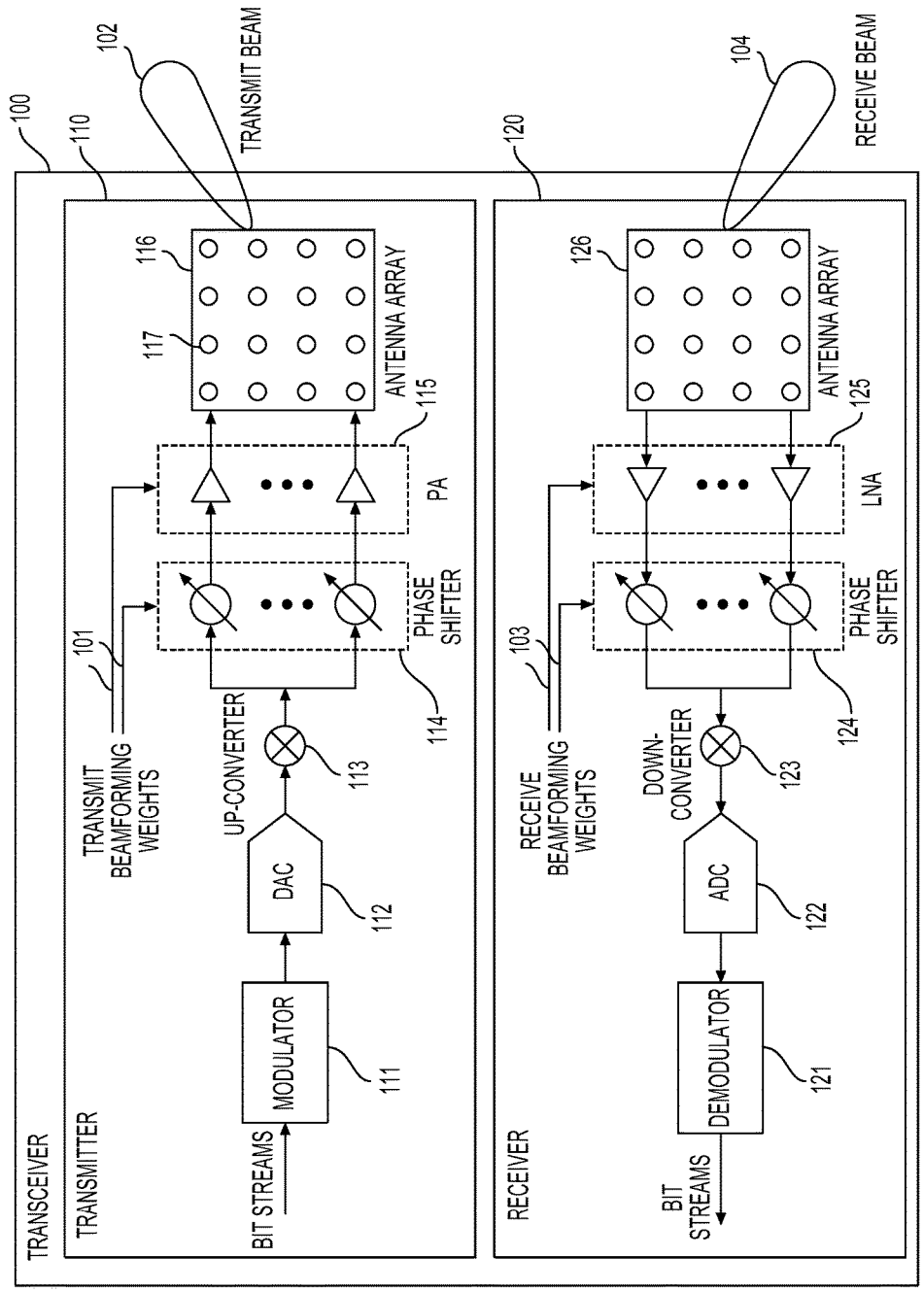
FIG. 1 shows an example transceiver capable of beamforming according to an embodiment of the disclosure.

FIG. 1 shows an example transceiver 100 according to an embodiment of the disclosure. The transceiver 100 is capable of beamformed transmission and reception. For example, the transceiver 100 can be employed in a base station (BS) or a user equipment (UE) in a wireless communication system. The wireless communication system can employ the 5th generation (5G) technologies developed by the 3rd Generation Partnership Project (3GPP). For example, millimeter Wave (mm-Wave) frequency bands and beamforming technologies can be employed in the wireless communication system.

The transceiver 100 can be used by the BS or the UE to perform beamformed transmission or reception. In beamformed transmission, wireless signal energy can be focused on a specific direction to cover a target serving region. As a result, an increased antenna transmitting gain can be achieved in contrast to omnidirectional antenna transmission. Similarly, in beamformed reception, wireless signal energy received from a specific direction can be combined to obtain a higher antenna receiving gain in contrast to omnidirectional antenna reception.

In FIG. 1 example, the transceiver 100 can include a transmitter 110 and a receiver 120. The transmitter 110 can include a modulator 111, an analog to digital converter (ADC) 112, an up-converter 113, a set of phase shifter 114, a set of power amplifiers (PAs) 115, and an antenna array 116. Those components are coupled together as shown in FIG. 1.

The modulator 111 is configured to receive bit streams and generate a modulated signal. For example, the bit streams can carry control channel information, data channel information, reference signal (RS) sequences, and the like. For example, protocol entities corresponding to different protocol layers in a protocol stack can be created at the BS or UE to facilitate communications between the BS and the UE. The control and data channels are defined from physical layer perspective. The control channel information can include control signaling generated from a physical layer. The control channel information can be signaled between the BS and the UE, for example, to provide information required for successful demodulation of the data channel information. The data channel information can include data generated or to be received at user applications in the UE, and/or control-plane information generated from a media access control (MAC) layer or from a layer above MAC layer. For example, the user applications can include voice or video applications, web browsers, and the like. The data channel information or control channel information can be encoded with various channel coding methods before received at the modulator 111.

The RS sequences can include different sequences known to both the UE and the BS for various purposes. For example, different RS sequences can be used for channel estimation, beam pair link quality measurement, synchronization or random access during an initial access process, and the like. In one example, the modulator 111 is an orthogonal frequency-division multiplexing (OFDM) modulator. Accordingly, control channel information, data channel information, or RS sequences can be mapped to specific time-frequency resources in an OFDM sub-frame carried in the modulated signal.

The DAC 112 is configured to receive the modulated signal in digital form and generate an analog signal. The up-convertor 113 transfers the analog signal to a carrier frequency band to generate an up-converted signal.

The up-converted signal is split into multiple signals each passing through a separate path. Each separate path can include one of the multiple phase shifters 114 and one of the multiple PAs 115, and subsequently be coupled to an antenna element 117 of the antenna array 116. A set of transmit beamforming weights 101 can be imposed on each phase shifter 114 and PA 115 such that each split signal can be delayed and gain-controlled according to a respective beamforming weight 101. In one embodiment, transmit beamforming weights 101 require only phase control on the up-converted signal and are thus applied on phase shifters 114. As a result, the gain of PA 115 is not affected by transmit beamforming weights 101. The output signal from PA 115 is then used for driving the antenna array 116. It is noted that FIG. 1 example is for illustration purpose and does not mean to put constraint on implementation. For example, the order of PA 115 and phase shifters 114 can be swapped as well.

The antenna array 116 can include a plurality of antenna elements 117. In one example, the antenna elements 117 are uniformly distributed on a panel, and are equally spaced in a vertical or horizontal direction. Each antenna element 117, driven by a split signal having a specific delay, can radiate a radio wave and propagate in directions based on its antenna radiation pattern. Radio waves from the plurality of antenna elements 117 can interfere with each other. Radio waves towards a particular angle with respective to the antenna array 116 can experience constructive interference or destructive interference. A transmit beam 102 can thus be formed in a direction where constructive interference occurs. The transmit beam 102 includes directionally transmitted wireless signals resulting in signal energy being focused on a particular direction. In contrast, signals at directions where destructive interference takes place cancel with each other resulting in reduced radiation energy at those directions.

In operation, by imposing different sets of beamforming weights 101, the transmit beam 102 can be directed to different directions. In addition, a shape of the beam 102 can also be adjusted by adjusting the beamforming weights 101. For example, the width of the transmit beam 102 can be adjusted to be narrower or wider by adjusting the beamforming weights 101. In some examples, amplitudes of the split signals can be adjusted in combination with adjustments of phases of the split signals to adjust the shape and/or the direction of the transmit beam 102.

In some examples, the transceiver 100 can include additional one or more set of transmitter circuits that include components similar to that of the transmitter 110. The multiple sets of transmitter circuits can each generate a transmit beam, and multiple transmit beams can be transmitted simultaneously. In this way, the same set of data or different sets of data can be transmitted via the multiple transmit beams in multiple directions simultaneously.

The receiver 120 can include a demodulator 121, an analog to digital converter (ADC) 122, a down-converter 123, a set of phase shifters 124, a set of low noise amplifiers (LNAs) 125 and an antenna array 126. The phase shifters 124 and the antenna array 126 can have similar structure and function as the phase shifters 114 and the antenna array 116. The LNAs 125 amplify signals received from antenna elements of the antenna array 126.

In operation, the phase shifters 124, the LNAs 125, and the antenna array 126 can operate together to form a receive beam 104. Specifically, each antenna element of the antenna array 126 can receive radio signals in directions based on its antenna radiation pattern, and generate a current signal indicating received energy of the radio signals. Each current signal can then be fed to a path including one of the LNAs 125 and one of the phase shifters 124. The LNAs 125 can receive a set of receive beamforming gain-control weights 103. The current signals can be amplified by the LNAs 125 according to the gain-control weights. The phase shifters 124 can receive a set of receive beamforming weights 103, and accordingly cause a delay on each amplified current signal. The gain-controlled and delayed signals can then be combined to generate a combined signal. In alternative examples, the set of receive beamforming weights 103 may only require phase control and are thus not applied on the LNAs 125. The amplification, phase shifting and combination operations can result in a receive beam 104. Radio signals received from the direction of the receive beam 104 can be constructively combined in the combined signal while radio signals from other directions can be cancelled with each other in the combined signal.

The down-converter 123 can shift the combined signal from a carrier frequency band to generate a base band analog signal. The ADC 122 can convert the analog signal to a digital signal. The demodulator 121 demodulates the digital signal and generates information bits that may correspond to, for example, control channel information, data channel information, or outputs RS sequences. It is noted that FIG. 2 example is for illustration purpose and does not mean to put constraint on implementation. For example, the order of LNA 125 and phase shifters 124 can be swapped as well.

While the transceiver 100 described in FIG. 1 example has an analog beamforming architecture in which analog circuits are employed for beamforming operations, other beamforming architectures can be employed in other examples. For example, a transceiver can be built with a digital beamforming architecture in which phase shifting or amplitude scaling are performed over base band signals with digital processing circuits. Alternatively, a hybrid beamforming architecture can be employed, and digital and analog processing can be performed for beamformed transmission and reception.

Figure 2:
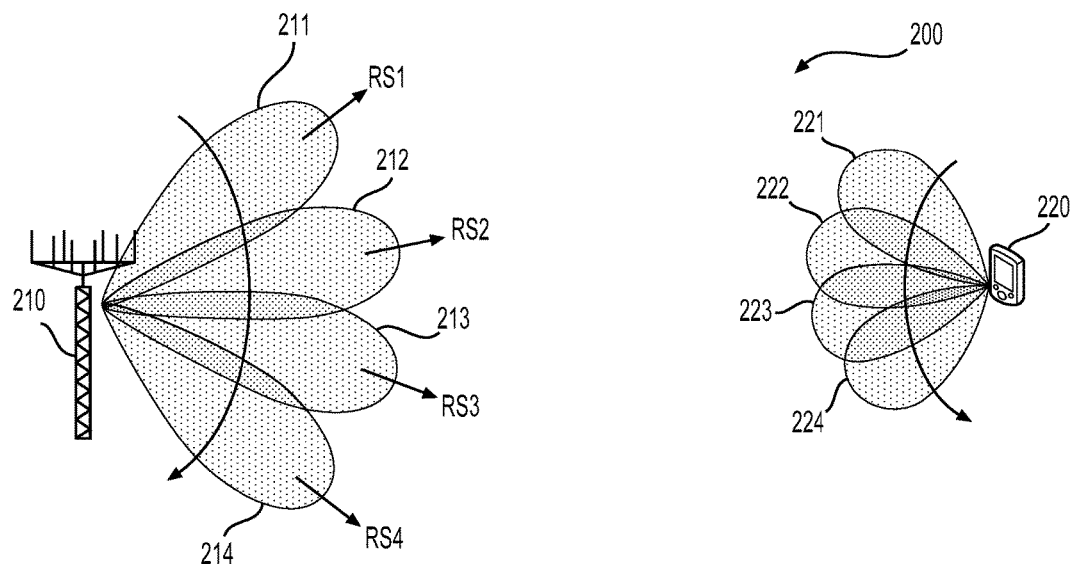
FIG. 2 shows an example beam training process according to an embodiment of the disclosure.

FIG. 2 shows an example beam training process 200 according to an embodiment of the disclosure. The beam training process 200 can be performed to select a beam pair link based on quality measurements of multiple possible beam pair links between a BS 210 and a UE 220. The selected beam pair link can be used for later communication between the BS 210 and the UE 220. A beam pair link can refer to a communication link between a BS and a UE formed with a pair of receive beam and transmit beam being used between the BS and the UE. For a certain environment of the BS and the UE, different beam pair links can have different quality. Among them, a beam pair link can be selected for communications between the BS and the UE. The selection can be based on, for example, a threshold, so that a beam pair link with a quality above the threshold can be selected.

The BS 210 can be part of a wireless communication network in which mm-Wave frequency bands and beamformed transmission are employed. The BS 210 can employ a beamforming transceiver, such as the transceiver 100 in FIG. 1 example, to generate one transmit beam at a time or multiple transmit beams simultaneously. In FIG. 2 example, four transmit beams 211-214 can be generated successively to cover a serving region of the base station 210. The serving region can be a sector of a whole serving area of the BS station.

The LE 220 is located within the serving region covered by the four transmit beams 211-214. The UE 220 can be a mobile phone, a laptop computer, a vehicle carried mobile communication device, and the like. Similarly, the UE 220 can employ a beamforming transceiver, such as the transceiver 100 in FIG. 1 example, to generate one receive beam at a time or multiple receive beams simultaneously. In FIG. 2 example, four receive beams 221-224 can be successively generated to cover a receiving area.

The beam training process 200 can include two stages. At a first stage, a beam pair quality measurement process can be performed. Specifically, the BS 210 can generate the transmit beams 211-214 successively sweeping the covered sector. Each transmit beam 211-214 can carry RS resources RS1-RS4. While one of the transmit beams 211-214 is being transmitted, the UE 220 can rotate through the four receive beams 221-224 in, for example different transmission occasions of individual transmit beams 211-214. In this way, all combinations of beam pairs between the transmit beams 211-214 and receive beams 221-224 can be established and investigated. For example, for each beam pair, the UE 220 can employ the RS resources to compute one or more quality measurements, such as a signal-to-noise ratio (SNR) related metric, SINR related metric, or reference signal received power (RSRP), for the respective beam pair link.

At a second stage, a beam pair link for downlink communication between the BS 210 and the UE 220 can be determined. In one example, the UE 220 selects a beam pair link with the highest quality and informs the BS 210 of the selection. In another example, a measurement report including the computed quality measures can be provided to the BS 210 from the UE 220. The BS 210 subsequently makes a decision and informs the UE 220 of the selection. In either case, a beam pair index can be assigned to each beam pair link. The beam pair indices can then be used for signaling a beam pair link between the BS 210 and the UE 220.

Figure 3:
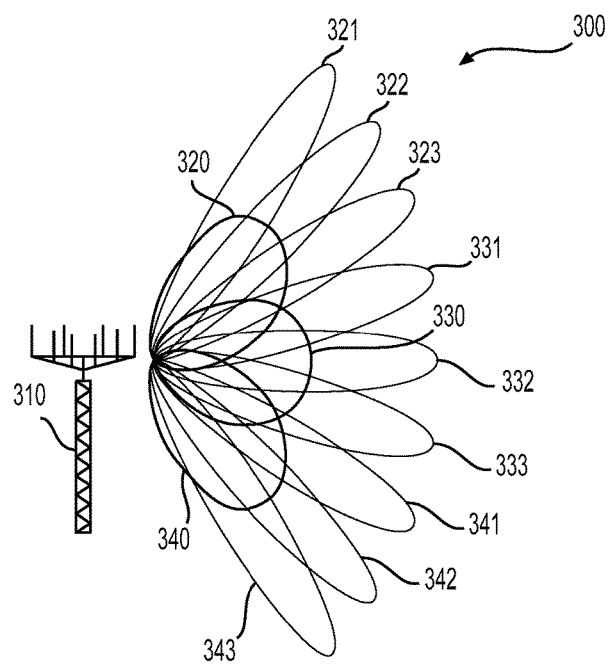
FIG. 3 shows a hierarchical beamforming structure according to an embodiment of the disclosure.

FIG. 3 shows a hierarchical beamforming structure 300 according to an embodiment of the disclosure. The hierarchical beamforming structure 300 can include the following two levels of transmit beams transmitted from a BS 310: a first level of transmit beams 320-340, referred to as control beams, and a second level of transmit beams 321-323, 331-333, and 341-343, referred to as dedicated beams. Particularly, each control beam 320-340 is associated with a group of dedicated beam. For example, the control beam 320 is associated with the dedicated beams 321-323. The control beam 320 and the dedicated beams have different special resolutions, and angular coverages of each associated dedicated beam 321-323 is a subset of an angular coverage of the respective control beam 320. Similarly, the control beam 330 is associated with the dedicated beams 331-333, while the control beam 340 is associated with the dedicated beams 341-343.

Control beams 320-340 can have a coarse spatial resolution compared with the dedicated beams 321-323, 331-333, and 341-343. In one example, control beams 320-340 can be used for transmission of control channel. For example, each control beam 320-340 can broadcast non-cell-specific system information, such as a system information block (SIB) or a master information block (MIB) similar to an LTE system. Each control beam 320-340 can also be used to carry UE specific control or data traffic. Transmissions of each control beam 320-340 can include sets of known RSs to a UE for purposes of initial time-frequency synchronization, identification of the respective control beam, bean pair link quality measurement, and the like.

In FIG. 3 example, the control beams 320-340 are transmitted in a time sweeping manner. Specifically, one control beam is generated at a time point, and the control beams 320-340 are generated successively to cover a serving area, such as a sector of a whole coverage of the BS 310. The time sweeping process can be performed repeatedly over the serving region.

Dedicated beams 321-323, 331-333, and 341-343 can have a finer spatial resolution compared with the control beams 320-340. The dedicated beams 321-323, 331-333, and 341-343 can be used to transmit UE specific data, such as data of user applications, or to transmit UE-specific control information. Transmissions of dedicated beams 321-323, 331-333, and 341-343 can also include RSs known to UEs for various purposes, such as a beam training, channel estimation, and the like. In FIG. 3 example, multiple dedicated beams 321-323, 331-333, and 341-343 are employed to cover a serving area the same as that of the control beams 320-340. However, in one example, only a subset of the dedicated beams 321-323, 331-333, and 341-343 are transmitted for a time period in certain directions where UEs are present. For directions where no UE exists, dedicated beams towards those directions are not generated. The subset of the dedicated beams 321-323, 331-333, and 341-343 can be generated simultaneously to cover different directions, or in a time division multiplex (TDM) manner. From UE perspective, a beam training process can be used to decide which BS beam(s) is used as control channel beam for control channel information transmission and which BS beam(s) is used as data channel beam for data channel transmission. A control channel beam for a UE can be a control beam or a dedicated beam. A data channel beam for a UE can be a control beam or a dedicated beam. In a preferred example, a control channel beam for a UE is selected from control beams, and a data channel beam for a UE is selected from dedicated beams.

Figure 4:
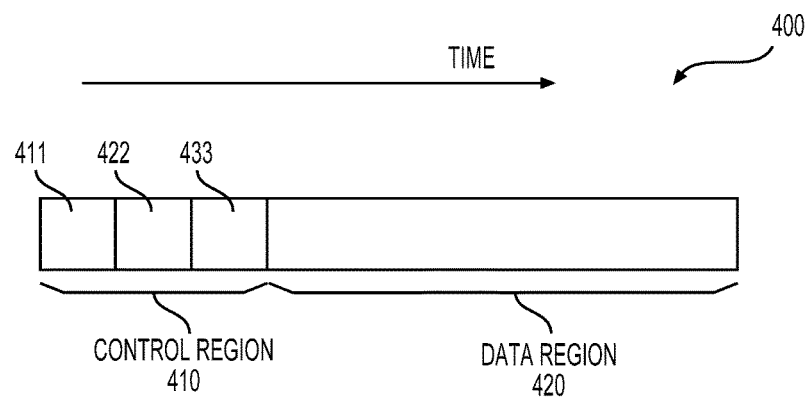
FIG. 4 shows an example sub-frame for beamformed transmission according to an embodiment of the disclosure.

FIG. 4 shows an example sub-frame 400 according to an embodiment of the disclosure. The sub-frame 400 can represent a structure of signals transmitted from the BS 310 in the FIG. 3 example. As shown, the sub-frame 400 can include a control region 410 and a data region 420. The control region 410 can be transmitted with control beams 320-340. For example, the control region 410 can include three sub-regions 411-433 corresponding to three successive time slots. Each sub-region 411-433 can be transmitted with one of the three control beams 320-340. The data region 420 can be transmitted with a subset of dedicated beams 321-323, 331-333, and 341-343 or with a subset of control beams 320-340, either simultaneously or in a TDM manner. In one example, OFDM techniques are employed. Accordingly, the control region 410 or data region 420 can include multiple OFDM symbols, and each OFDM symbol can include a plurality of time-frequency resources.

Figure 5:
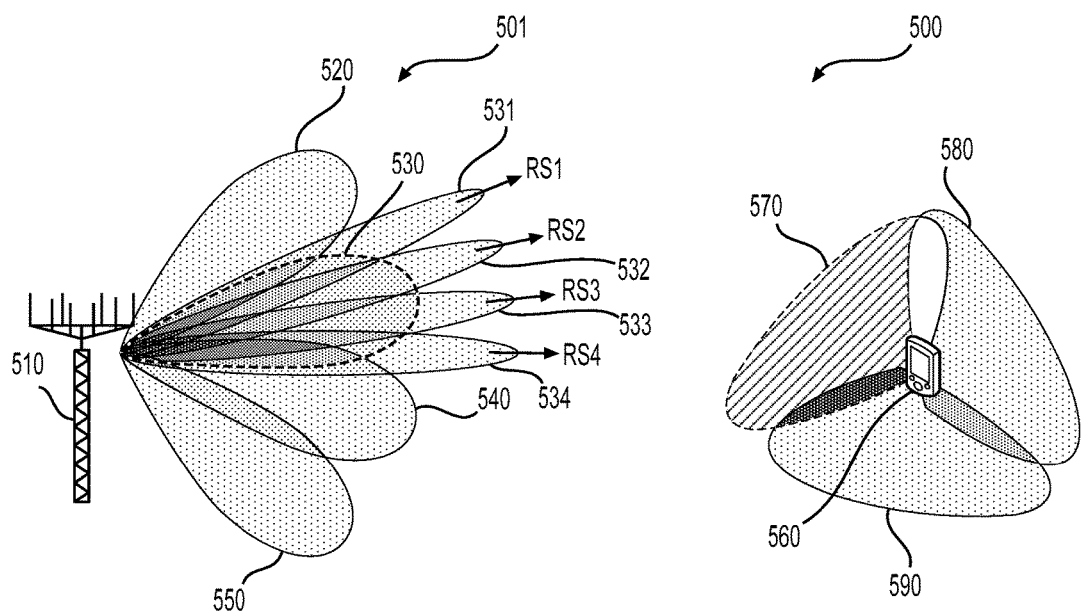
FIG. 5 shows a data channel beam training process according to an embodiment of the disclosure.

FIG. 5 shows a dedicated beam training process 500 according to an embodiment of the disclosure. The dedicated beam training process 500 can be performed to determine a beam pair formed by a BS transmit dedicated beam and a UE receive beam for data communication between a BS and a UE. The determined beam pair with a BS transmit dedicated beam can be served as a data channel beam for a concerned UE. The dedicated beam training process 500 can be based on the hierarchical beamforming structure described in FIG. 3 example.

A hierarchical beamforming structure 501 similar to that of the FIG. 3 example is shown at the left side of FIG. 5. The hierarchical beamforming structure 501 includes four control beams 520-540 transmitted from a BS 510. Each control beam 520-540 is associated with a group of dedicated beams having a finer beam width. However, only the group of dedicated beams 531-534 associated with the control beam 530 is shown. A UE 560 is shown at the right side of FIG. 5. The UE 560 can have three receive beams 570-590 for covering a 360 degree receiving area around the UE 560. In one example, one receive beam 570-590 is generated during a time period, and is steered to cover different directions in other time periods.

In an example, before the dedicated beam training process 500 is performed, a control connection between the BS 510 and the UE 560 is established with a beam pair formed by one control beam 520-550 and one receive beam 570-590. The beam pair is at least served as a control channel beam for the concerned UE. In addition, anchor associations known to both the BS 510 and the UE 560 are also established for beam training process 500. An anchor association relates a beam pair link (which is formed by a BS control beam 520-550 and a UE receive beam 570-590) to to-be-trained dedicated beams. An anchor association informs which control beam the to-be-trained dedicated beams are associated with, and can be indicated by a beam pair index assigned to the respective beam pair which can be referred to as an anchor association index. From UE perspective, an anchor association indicates that concerned transmissions from the respective to-be-trained dedicated beams can be received with same receive method e.g., with same UE receive beam, as that used for receiving the associated control beam indicated by the anchor association. From network (NW) perspective, associating a control beam with a set of dedicated beams can imply that these beams (the control beam and the set of dedicated beams) have overlapped angular coverage. For example, control beam 530 is associated with dedicated beams 531-534 from NW perspective. The control connection and the anchor associations can be used to facilitate the dedicated beam training process 500.

As an example, the control connection can be established during an initial access process in a time division duplexing (TDD) system. For example, the BS 510 can transmit control beams 520-550 in successive time slots in a control region of a sub-frame in a way similar to the sub-frame in FIG. 4 example. Each control beam 520-550 can carry synchronization signal (SS) sequence(s) (not shown). The transmission can be repeatedly performed for each sub-frame transmitted by the BS 510. The UE 560 initiates the initial access process after being powered on. The UE 560 can monitor the successive SS sequence(s) transmission in a first sub-frame with a first receive beam 570. As a result, beam pair link qualities of beam pairs 520-570, 530-570, 540-570, and 550-570 can be measured based on the SS sequences.

Similarly, a second and third receive beams 580 and 590 can be used to receive SS transmission during a second and third sub-frames, respectively. In this way, beam pair link qualities corresponding to all possible beam pairs between the control beams 520-550 and the receive beams 570-590 can be measured. Based on the measurement results, the UE 560 can select a proper beam pair link for downlink communication between the BS 510 and UE 560.

Subsequently, the UE 560 can perform a random access procedure and inform the BS 510 at least about the beam pair link selection result based on the control beams 520-550. As a result, the BS 510 can establish a beam pair link from the control beams 520-550 and the receive beams 570-590. Each beam pair link may be assigned with a beam pair index which can be used as an anchor association index. Information of the anchor associations can then be transmitted to the UE 560 when configuring or trigger dedicated beam training process 500. This way, the BS 510 and the UE 560 have a common understanding about the anchor associations for the to-be-trained dedicated beams during dedicated beam training process 500. Based on the measurement results, the UE 560 can also determine a corresponding UL beam pair link for uplink communication. In this way, a control connection based on the respective control beam and receive beam can be established.

For the dedicated beam training process 500, the BS 510 can first transmit beam training configuration information through the established control connection to the UE 560. For example, an anchor association index indicating the beam pair of the control beam 530 and the receive pair 570 can be transmitted and received at the UE 560. Based on the anchor association index, the UE 560 can know that the receive beam 570 can be used for the training process.

In addition, configurations for beam pair link quality measurement can also be transmitted. In the above example, as indicated by the anchor association index, the dedicated beams 531-534 that are associated with the control beam 530 are to be evaluated during the training process. Therefore, configurations of beam training RS resources RS1-RS4 corresponding to each dedicated beam 531-534 can be transmitted to the UE 560. The configurations of beam training RS resources can specify the RS resources in physical resource domain, signal sequence domain, and its time-domain repetition pattern if needed. For example, time-frequency resources in a data region of a sub-frame as well as RS sequences can be specified for each dedicated beam 531-534.

Further, data transmission RS resources for data transmission after a data channel beam has been selected can also be transmitted to the UE 560. The data transmission RS resources can have various formats and used for various purposes. For example, the data transmission RS resources can be used to estimate a downlink channel condition. The estimation results can be used for a demodulation operation at the UE 560, or reported to the BS 510 as channel state information (CSI). The data transmission RS resources can have the same or different format and/or purposes as the beam training RS resources RS1-RS4 in FIG. 5 example. In one example, one of the beam training RS resources RS1-RS4 is used as the data transmission RS resources. For example, the first beam training RS resources RS1 can be used for data transmission purpose. In this way, in one example, RS resources are reused between dedicated beam training and data channel beam transmission. Note that the configuration of data transmission RS resources can be in a separate signaling from the one for dedicated beam training process 500.

After transmission of the configuration information, a beam pair link quality measurement process can be performed in a way similar to what is described in the FIG. 2 example, however, only one receive beam 570 is used during the beam pair link quality measurement process. Accordingly, beam pair link qualities corresponding to beam pairs 531-570, 532-570, 533-570, and 534-570 can be measured. During the quality measurement process, the UE 560 uses the receive beam 570 indicated by the anchor association index to receive beam training RSs from each dedicated beams 531-534.

During the quality measurement process, the four dedicated beams 531-541 can be generated successively in a data region of a sub-frame. Transmission of each dedicated beam 531-534 can last for one or more OFDM symbols. The OFDM symbols corresponding to each dedicated beam 531-534 can include the beam training RS resources R1-R4 configured for the respective dedicated beam 531-534. Results of the beam pair link quality measurement process can then be reported to the BS 510 via e.g., the control connection.

Subsequently, the BS 510 can select a data channel beam from the dedicated beams 531-534 based on the results of the beam pair link quality measurement process. For example, a dedicated beam with a highest reported quality can be selected as data channel beam for concerned UE. Thereafter, the BS 510 can apply the previously configured data transmission RS resources to the selected data channel beam for data transmission. Particularly, in one example, the BS 510 does not signal the UE 560 which data channel beam is selected. UE 560 can assume the same receive method (receive beam) as previously indicated for data reception. In one example, the indication of selected data channel beam may take place in the form of anchor association. That is to say, UE can receive subsequent data transmission by a receive method indicated by information similar to anchor association, without needing to know exact BS beam which is used for data transmission. In another example, such information of anchor association can be ignored when there is no change from the previous one. It is noted that the information of anchor association for data reception is not necessarily the same one as the anchor association in dedicated beam training process 500. They can be in similar format but with individual signaling instances for individual purposes.

Figure 6A:
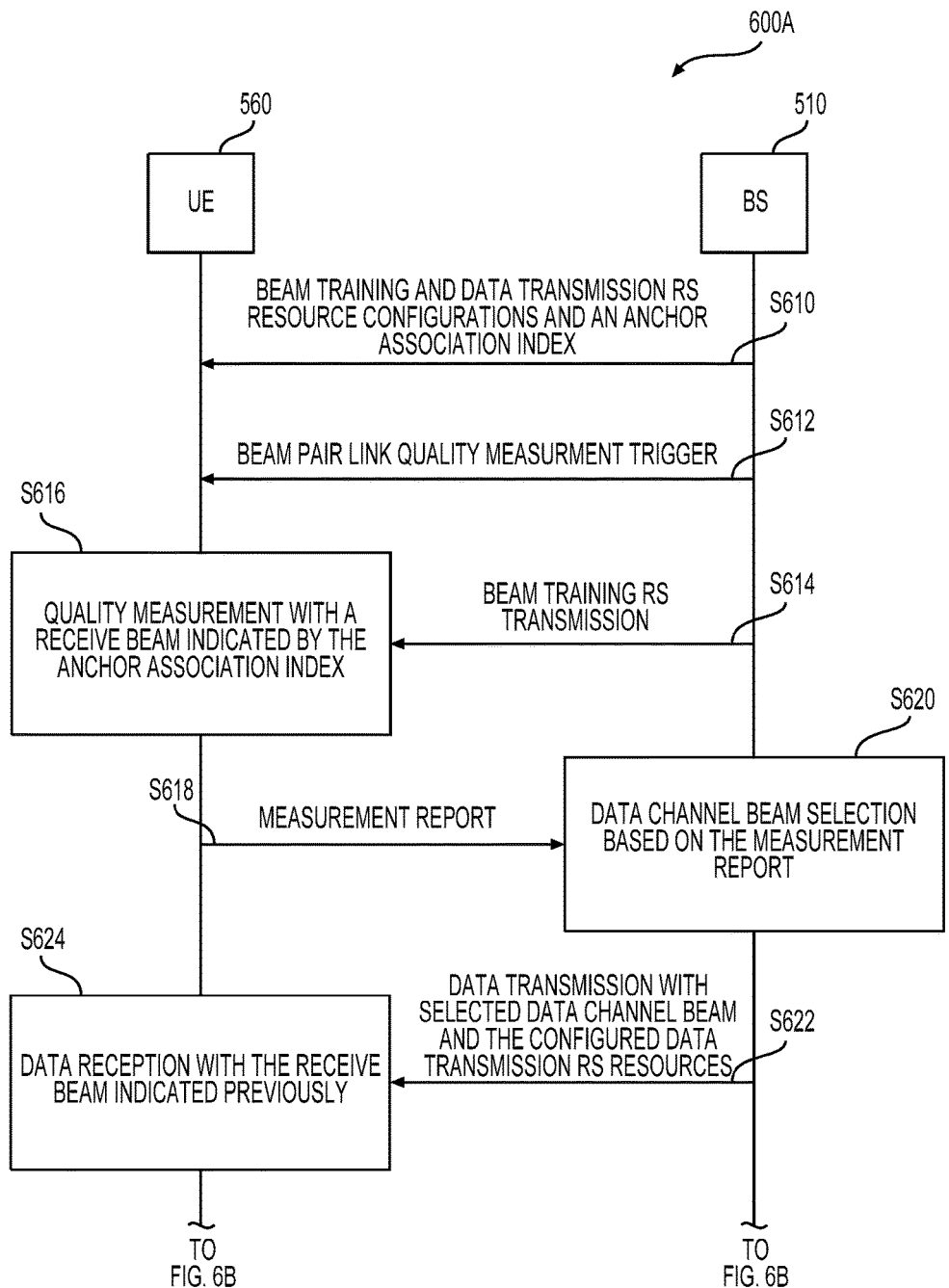
FIGS. 6A-6B show flowcharts of an example data channel beam training process according to an embodiment of the disclosure.

FIG. 6A shows a flowchart of an example data channel beam training process 600A according to an embodiment of the disclosure. The process 600A is explained with reference to FIG. 5. The process 600A can be performed to select a data channel beam for data transmission of a UE from the group of candidate dedicated beams 531-534 that are associated with the control beam 530 according to a hierarchical beamforming structure. The process 600A can be performed by the UE 560 and the BS 510.

At S610, configuration information for performing the process 600A is transmitted from the BS 510 to the UE 560. For example, the UE 560 is in connected mode. A connection between the UE 560 and BS 510 can be established via a beam pair. The beam pair can be the pair of control beam 530 and receive beam 570, the pair of dedicated beam 531 and the receive beam 570, or the pair of control beam 520 and the receive beam 570. Using the established connection, the BS 510 can transmit the configuration to the BS 560, for example, by transmitting a radio resource control (RRC) protocol message. Alternatively, part of the configuration information, such as the anchor association index can be separately transferred through a physical layer control channel.

The configuration information can include beam training RS resource configuration, data transmission RS resource configuration, and an anchor association index. More than one set of beam training RS resources can be configured. When one or more beam training RS resources are used as data transmission RS resources, an indication of such a configuration can be used to replace explicit configuration of data transmission RS resources. The anchor association index indicates the receive beam 570 will be used for evaluating the group of candidate dedicated beams 531-534. It is noted that a control beam indicated by the anchor association index, such as the control beam 530, can be different from a control channel beam that is currently being used for control information transmission between the UE 560 and the BS 510. However, this does not affect UE's selection on receive method since different associated control beams simply mean using different receive methods (e.g. receive beam) for the indicated training process.

At S612, a beam pair link quality measurement process is triggered. For example, one or more sub-frames can be scheduled for transmission of the candidate dedicated beams 531-534. Each candidate dedicated beams 531-534 can last for one or more OFDM symbols. Scheduling information of such transmission can be provided to the UE 560 e.g., via the configuration at S612. When multiple sets of beam training RS resources are configured, an individual RS set may be associated with individual anchor association. Upon triggered for RS transmission, an indication of one set of the resources can be provided to the UE 560. In one example, the anchor association index is not transmitted at 610. Instead, the anchor association index can be transmitted at S612 when the beam pair link quality measurement process is triggered. For example, trigger information and the anchor association index information can be transmitted through a physical control channel. In this way, triggering a measurement process can be periodically performed quickly without usage of the RRC connection. In addition, the trigger operation can be performed repeatedly without retransmission of the configuration information (beam training RS resource configuration, data transmission RS resource configuration).

At S614, beam training RSs are transmitted from the dedicated beams 531-534 successively in accordance with the configuration of the beam training RS resources. At S616, quality measurement is performed by the UE 560. Particularly, according to the received anchor association index, the receive beam 570 is used by the UE 560 to receive the beam training RSs. In addition, the beam training RSs are obtained and processed by the UE 560 in accordance with the configuration of the beam training RS resources. At S618, a measurement report is provided from the UE 560 to the BS 510. The measurement report can include measured qualities of each or a portion of the beam pair links 531-570, 532-570, 533-570 and 534-570, and identifiers for the reported dedicated beams e.g., in terms of RS resource indices.

At S620, a data channel beam is selected based on the measurement report. The selection result needs not be provided to the UE 560. For example, the beam pair link 531-570 has a highest quality among the beam pair links 531-570, 532-570, 533-570 and 534-570, and accordingly the data channel beam 531 can be selected. At S622, data transmission can be performed with the selected data channel beam 531. Particularly, the data transmission RS resources configured at S610 can be associated with the selected data channel beam 531, and used for subsequent data transmission. At S624, data reception is performed by the UE 560 with the receive beam 570 as indicated previously for data reception. In addition, respective data transmission RSs can be obtained and processed according to the configurations of the data transmission RS resources received from the BS 510. In a sense, the newly determined data channel beam is not needed to be indicated to UE because the new data channel beam does not change anchor association status from previous association. In cases that such association needs to be change, an additional indication is needed. For example, assuming original anchor association is BS beam 530. If new dedicated beam training involves dedicated beams associated with control beam 540 and a dedicated beam associated with control beam 540 is to be used as new data channel beam after the dedicated beam training, an update information implying UE receive method for data channel beam can be signaled.

Figure 6B:
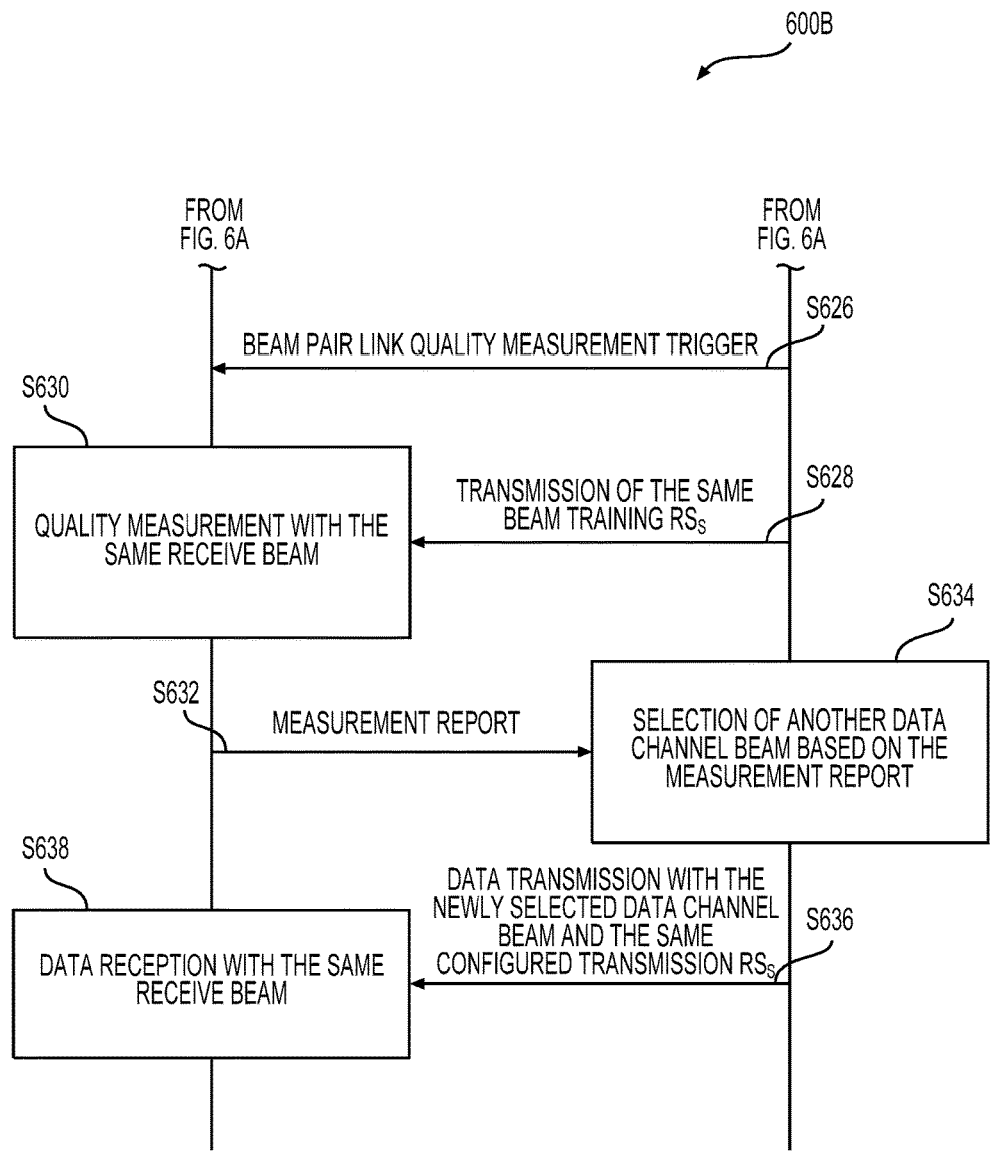

FIG. 6B shows a flowchart of a data channel beam monitoring and reselection process 600B according to an embodiment of the disclosure. Similarly, the process 600B is explained with reference to FIG. 5. The process 600B can be performed after the process 600A to switch from a previously selected data channel beam to a newly selected data channel beam based on a beam pair link quality measurement process. For example, the UE 560 can move into a new location, and quality of the current beam pair link 531-570 can become worse and not suitable for subsequent data communications. In this scenario, data channel beam reselection may take place. Particularly, the process 600B can be performed with the same set of beam training and data transmission RS resource configurations as that of the process 600A, and no update information implying UE receive method for data channel beam and/or for dedicated beam training is transmitted in the process 600B.

At S626, beam pair link quality measurement can be triggered, for example, for the purpose of monitoring qualities of available beam pairs 531-570, 532-570, 533-570 and 534-570. For example, the BS 510 can provide information to the UE 560 indicating that the same set of beam training and data transmission RS resource configurations and the same anchor association index as transmitted at S610 are to be used. For example, sending trigger information without transmission of any configuration information can imply the previous configuration information transmitted at S610 can be used. At S628, similarly to S614, the same set of beam training RSs is transmitted with the same configuration of beam training RS resource configurations. At S630, similarly to S616, beam pair link quality measurement is performed with the same receive beam indicated by the anchor association index transmitted at S610. At S632, a new measurement report is provided including new measurement results.

At S634, a data channel beam different from the currently-being-used data channel beam 531 can be selected based on the new measurement report. For example, due to movement of the UE 560, the beam pair link of the beam pair 532-570 becomes a better choice for data transmission than that of the beam pair 531-570. Accordingly, the data channel beam 532 can be selected. At S636, data transmission from the BS 510 is performed with the newly selected data channel beam 532. The same data transmission RS resources as configured at S610 can be used by the newly selected data channel beam 532 for data transmission. The above data channel beam switch operation need not be signaled to the UE 560. Since the new data channel beam 532 is associated to control beam 530 as well, corresponding anchor association is not changed. At S638, data reception is performed with the same receive beam 570 based on the same set of data transmission RS resources.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
   transmitting a beam training reference signal (RS) resource configuration from a base station (BS) to a user equipment (UE) in a wireless communication system;
   transmitting an anchor association index indicating a receive beam of the UE for receiving beam training RSs configured according to the beam training RS resource configuration from the BS;
   transmitting the beam training RSs according to the beam training RS resource configuration; and
   receiving a measurement report from the UE including quality measurements corresponding to indexes of a subset of the received beam training RSs.

2. The method of claim 1, wherein the anchor association index indicating an association between the receive beam of the UE and the bean training RSs configured according to the beam training RS resource configuration.

3. The method of claim 1, further comprising:
   selecting a transmit beam of the BS based on the measurement report;
   transmitting a data transmission RS resource configuration from the BS to the UE; and
   transmitting data according to the data transmission RS resource configuration on the selected transmit beam.

4. The method of claim 3, wherein a same set of RS resources is used in the beam training RS resource configuration and the data transmission RS resource configuration.

5. The method of claim 1, further comprising:
   establishing a radio resource control (RRC) connection via a beam pair link formed by a transmit beam of the BS and a receive beam of the UE, wherein the beam training RS resource configuration and the data transmission RS resource configuration are transmitted via the RRC connection.

6. The method of claim 5, wherein the anchor association index is transmitted via the RRC connection or a physical layer control channel.

7. A method, comprising:
   receiving a beam training reference signal (RS) resource configuration from a base station (BS) at a user equipment (UE) in a wireless communication system;
   receiving an anchor association index indicating a receive beam of the UE for receiving beam training RSs configured according to the beam training RS resource configuration from the BS;
   receiving the beam training RSs configured according to the beam training RS resource configuration with the receive beam of the UE indicated by the anchor association index according to the beam training RS resource configuration; and
   transmitting a measurement report including quality measurements corresponding to indexes of a subset of the received beam training RSs.

8. The method of claim 7, further comprising:
   receiving a data transmission RS resource configuration from the BS at the UE; and
   receiving data according to the data transmission RS resource configuration with the receive beam of the UE, the data being transmitted on a transmit beam of the BS that is selected based on the measurement report.

9. The method of claim 8, wherein a same set of RS resources is used in the beam training RS resource configuration and the data transmission RS resource configuration.

10. The method of claim 8, further comprising:
    establishing a radio resource control (RRC) connection via a beam pair link formed by a transmit beam of the BS and a second receive beam of the UE, wherein the beam training RS resource configuration and the data transmission RS resource configuration are transmitted via the RRC connection.

11. The method of claim 10, wherein the anchor association index is transmitted via the RRC connection or a physical layer control channel.

12. The method of claim 11, wherein the second receive beam of the UE and the receive beam of the UE are a same beam.

13. A user equipment (UE), comprising circuits configured to:
    receive a beam training reference signal (RS) resource configuration from a base station (BS) in a wireless communication system;
    receive an anchor association index a receive beam of the UE for receiving beam training RSs configured according to the beam training RS resource configuration from the BS;
    receive the beam training RSs configured according to the beam training RS resource configuration with the receive beam of the UE indicated by the anchor association index according to the beam training RS resource configuration; and
    transmit a measurement report including quality measurements corresponding to indexes of a subset of the received beam training RSs.

14. The UE of claim 13, wherein the circuits is further configured to:
    receive a data transmission RS resource configuration from the BS; and
    receive data according to the data transmission RS resource configuration with the receive beam of the UE, the data being transmitted on a transmit beam of the BS that is selected based on the measurement report.

15. The UE of claim 14, wherein a same set of RS resources is used in the beam training RS resource configuration and the data transmission RS resource configuration.

16. The UE of claim 14, wherein the circuits is further configured to:
    establish a radio resource control (RRC) connection via a beam pair link formed by a transmit beam of the BS and a second receive beam of the UE, wherein the beam training RS resource configuration and the data transmission RS resource configuration are transmitted via the RRC connection.

17. The UE of claim 16, wherein the anchor association index is transmitted via the RRC connection or a physical layer control channel.

18. The method of claim 1, wherein the quality measurements corresponding to the indexes of the subset of the received beam training RSs includes a strongest quality measurement of the received beam training RSs.

19. The method of claim 1, wherein the receive beam of the UE is formed based on a set of beam forming weights.

20. The method of claim 7, wherein the anchor association index indicating an association between the receive beam of the UE and the bean training RSs configured according to the beam training RS resource configuration.

21. The method of claim 7, wherein the quality measurements corresponding to the indexes of the subset of the received beam training RSs includes a strongest quality measurement of the received beam training RSs.

22. The method of claim 7, wherein the receive beam of the UE is formed based on a set of beam forming weights.

* * * * *